(12) United States Patent
Hong et al.

(10) Patent No.: US 7,667,783 B2
(45) Date of Patent: Feb. 23, 2010

(54) HEAD MOUNTED DISPLAY WITH CURVED DISPLAY SCREEN, CURVED TUNABLE FOCUS LIQUID CRYSTAL MICRO-LENS AND FIRST AND SECOND CURVED BLACK MASKS CORRESPONDING INDEPENDENTLY TO ONE OF THE RIGHT AND THE LEFT EYE

(75) Inventors: Qi Hong, Orlando, FL (US); Ruibo Lu, Orlando, FL (US); Thomas Xinzhang Wu, Oviedo, FL (US); Shin-Tson Wu, Oviedo, FL (US)

(73) Assignees: University of Central Florida Research Foundation, Inc., Orlando, FL (US); Toppoly Optoelectronics Corp., Mieo-Li County (TW)

( * ) Notice: Subject to any disclaimer, the term of this patent is extended or adjusted under 35 U.S.C. 154(b) by 308 days.

(21) Appl. No.: 11/809,531

(22) Filed: Jun. 1, 2007

(65) Prior Publication Data

US 2008/0049152 A1 Feb. 28, 2008

Related U.S. Application Data

(62) Division of application No. 11/266,612, filed on Nov. 3, 2005, now Pat. No. 7,486,341.

(51) Int. Cl.
*G02F 1/1335* (2006.01)
(52) U.S. Cl. .............................. 349/11; 349/13; 349/15; 349/95; 349/110

(58) Field of Classification Search .................. 349/11, 349/13, 15, 95, 110, 111
See application file for complete search history.

(56) References Cited

U.S. PATENT DOCUMENTS

| 4,130,832 A | 12/1978 | Sher ............................ 358/89 |
| 5,355,181 A | 10/1994 | Ashizaki et al. ............. 348/744 |

(Continued)

OTHER PUBLICATIONS

Hongwen Ren, Yun-Hsin Fan, Sebastian Gauza, Shin-Tson Wu, "Tunable Microlens Arrays Using Polymer Network Liquid Crystal", Optics Communicaitons, vol. 230 (2004) pp. 267-271, Nov. 13, 2003, www.sciencedirect.com.

(Continued)

*Primary Examiner*—John Heyman
(74) *Attorney, Agent, or Firm*—Brian S. Steinberger; Phyllis K. Wood; Law Offices of Brian S. Steinberger, P.A.

(57) ABSTRACT

Systems, methods, apparatus and devices for head mounted stereoscopic 3-D display devices using the tunable focus liquid crystal micro-lens array eye to produce eye accommodation information. A liquid crystal display panel displays stereoscopic images and uses tunable liquid crystal micro-lens array to change the diopter of the display pixels to provide eye accommodation information. The head mounted display device includes a planar display screen, planar tunable liquid crystal micro-lens array and planar black mask. The display device may optionally include a bias lens. In an embodiment, the display device also includes a backlight and a prism sheet for displaying the images on the display screen. The display screen, tunable liquid crystal micro-lens array, black mask and optional backlight and prism may be flat or curved.

9 Claims, 17 Drawing Sheets

U.S. PATENT DOCUMENTS

| | | | |
|---|---|---|---|
| 5,499,138 A | 3/1996 | Iba | 359/569 |
| 5,506,705 A | 4/1996 | Yamamoto et al. | 349/64 |
| 5,666,174 A | 9/1997 | Cupolo, III | 349/64 |
| 6,712,471 B1 * | 3/2004 | Travis et al. | 353/7 |
| 6,714,174 B2 | 3/2004 | Suyama et al. | 345/32 |
| 6,809,786 B2 | 10/2004 | Lee | 349/115 |
| 2002/0123175 A1 | 9/2002 | Yamazaki et al. | 438/149 |
| 2002/0186339 A1 | 12/2002 | Hirakata et al. | 349/141 |
| 2004/0150758 A1 | 8/2004 | Tomono | 349/11 |
| 2004/0212550 A1 | 10/2004 | He | 349/6 |
| 2004/0246391 A1 | 12/2004 | Travis | |

OTHER PUBLICATIONS

Hongwen Re, Yun-Hsing Fan, Sebastian Gauza, Shin-Tson Wu, "Tunable-focus Flat \Liquid Crystal Spherical Lens," Applied Physics Letters, vol. 8, No. 23, Jun. 7, 2004 pp. 4789-4791, http://apl.aip.org/apl/copyright.jsp.

Yi-Hsin Lin, Hongwen Ren, Huan-Hsu Fan-Chiang, Wing-Kit Choi, Sebastian Gauza, Xinyu Zhu and Shin-Tson Wu, "Tunable-Focus Cylindrical Liquid Crystal Lenses," Japanese Journal of Applied Physics, vol. 44, No. 1A, (2005), pp. 243-244.

Hongwen Ren, Yun-Hsing Fan, Sebastian Gauza, Shin-Tson Wu, "Tunable-focus Flat Liquid Crystal Spherical Lens," Applied Physics Letters, vol. 84 No. 23, Jun. 7, 2004 pp. 4789-4791, http://apl.aip.org/apl/copyright.jsp.

* cited by examiner

HEAD MOUNTED DISPLAY WITH CURVED DISPLAY SCREEN, CURVED TUNABLE FOCUS LIQUID CRYSTAL MICRO-LENS AND FIRST AND SECOND CURVED BLACK MASKS CORRESPONDING INDEPENDENTLY TO ONE OF THE RIGHT AND THE LEFT EYE

This application is a divisional application of U.S. patent application Ser. No. 11/266,612 filed on Nov. 3, 2005 now U.S. Pat. No. 7,486,341.

FIELD OF THE INVENTION

The present invention relates to head mounted displays and, in particular, to apparatus, methods, systems and devices for head mounted stereoscopic 3-D display devices using the tunable focus liquid crystal micro-lens array eye to produce eye accommodation information, wherein the tunable liquid crystal micro-lens array changes the diopter of the display pixels to provide the eye accommodation information.

BACKGROUND AND PRIOR ART

The perception of three dimensional images is a visual effect created by stereoscopy, visual accommodation, perspective (apparent size dependent on distance), occlusion (objects in front hide what is behind), atmospheric effects (objects in the distance appear hazy), shading, and so on. Images presented by planar displays, such as CRTs, LCDs, projection displays, laser scan displays, and others, provide visual clues of a three dimensional image using perspective, occlusion, shading, and atmospheric effects at a fixed visual focal length that determined by the distance between the display screen and the audience. Stereoscopic displays, such as 3-dimensional LCDs and 3-dimensional head mounted displays, provide spatially distinct images to each eye so that the stereoscopy is also included in the visual clues for the perception of three dimensional images.

Although some 3-dimensional head mounted displays are superior to 3-dimensional LCDs in providing better stereoscopy images, the displayed images are still at a fixed visual focal length while the stereoscopy and visual accommodation are inherently related in the perception of a three dimensional image. Furthermore, because high power lenses are required to provide visible image on a screen adjacent to the eye, bulky configuration and heavy weight are the common problems in the optical system of conventional head mounted displays, especially when the field of view is increased. FIG. 1 shows the schematic diagram of the optical system in such a prior art. According to U.S. Pat. No. 4,130,832 issued to Sher on Dec. 19, 1978, and U.S. Pat. No. 5,355,181 issued to Ashizaki et al on Oct. 11, 1994 and U.S. Publication No. 2004/0130783 A1 published on Jul. 8, 2004, inventions about 3-D head mounted displays using variable focal length elements to modulate scanning light beam provided a solution to relating visual accommodation with the stereoscopy.

However, the high cost, complex configuration, high requirements of components arrangement accuracy are significant problems. According to prior art publications include Ren, Hongwen, Tunable microlens arrays using polymer network liquid crystal, Optics Communication, vol. 230 (2004), p. 267-271, and Lin, Yi-Hsin et al., Tunable-focus cylindrical liquid crystal lenses, Japanese Journal of Applied Physics, vol. 44 (2005), p. 243, and Ren, Hongwen, Tunable-focus flat liquid crystal spherical lens, Applied Physics Letter, vol. 84 (2004), p. 4789, several tunable focus liquid crystal lens were described.

Therefore, a need exists for a low cost method and device of head mounted display providing stereoscopy images with visual accommodation and the presented device is slim and light weight.

SUMMARY OF THE INVENTION

A secondary objective is to provide apparatus, methods, systems and devices using tunable liquid crystal micro-lens array to change the diopter of the display pixel to provide eye accommodation information.

A secondary objective is to provide s to provide apparatus, methods, systems and devices using tunable liquid crystal micro-lens array to change the diopter of the display pixel to provide eye accommodation information.

A third objective is to provide apparatus, methods, systems and devices for producing light weight head mounted visual displays with eye accommodation information.

A fourth objective is to provide apparatus, methods, systems and devices for a compact size head mounted visual displays for displaying three dimensional images with visual accommodation.

A fifth objective is to provide apparatus, methods, systems and devices for the head mounted visual display to display three dimensional images with visual accommodation with a high resolution.

A sixth objective is to provide apparatus, methods, systems and devices for head mounted visual displays with large field of view.

A seventh objective is to provide apparatus, methods, systems and devices for displaying three dimensional images with visual accommodation at a low cost.

A first preferred embodiment of the invention is to provide an improved method and device for producing eye accommodation information by alternating the diopter of display pixel using the tunable focus liquid crystal micro-lens array wherein the head mounted stereoscopic 3-D display devices. In a first embodiment, the display device comprises planar display screen, planar tunable liquid crystal micro-lens array, planar black mask, and bias lens.

In a second embodiment of the invention, the display device comprises planar display screen, planar tunable liquid crystal micro-lens array, planar black mask, and bias micro-lens array.

In a third embodiment of the invention, the display device comprises curved display screen, curved tunable liquid crystal micro-lens array, and curved black mask.

Further objectives, features, and advantages of this invention will be apparent from the following detailed descriptions of the presently preferred embodiments that are illustrated schematically in the accompanying drawings.

BRIEF DESCRIPTION OF THE FIGURES

FIG. 3b shows an example of a virtual image displayed on the planar emissive display screen being provided to the user as a retinal image using the configuration shown in FIG. 3a.

FIG. 4b shows an example of a virtual image displayed on the planar transmissive display screen being provided to the user as a retinal image using the configuration shown in FIG. 4a.

FIG. 5b shows an example of a virtual image displayed on the planar reflective display screen being provided to the user as a retinal image using the configuration shown in FIG. 5a.

FIG. 6b shows another example of a virtual image displayed on the planar reflective display screen being provided to the user as a retinal image using the configuration shown in FIG. 6a.

FIG. 8b shows an example of a virtual image displayed on the planar emissive display screen being provided to the user as a retinal image using the configuration shown in FIG. 8a.

FIG. 9b shows an example of a virtual image displayed on the planar transmissive display screen being provided to the user as a retinal image using the configuration shown in FIG. 9a.

FIG. 10b shows an example of a virtual image displayed on the planar reflective display screen being provided to the user as a retinal image using the configuration shown in FIG. 10a.

FIG. 11b shows another example of a virtual image displayed on the planar reflective display screen being provided to the user as a retinal image using the configuration shown in FIG. 11a.

FIG. 13b shows an example of a virtual image displayed on the curved emissive display screen being provided to the user as a retinal image using the configuration shown in FIG. 13a.

FIG. 14b shows an example of a virtual image displayed on the curved transmissive display screen being provided to the user as a retinal image using the configuration shown in FIG. 14a.

FIG. 15b shows an example of a virtual image displayed on the curved reflective display screen being provided to the user as a retinal image using the configuration shown in FIG. 15a.

DESCRIPTION OF THE PREFERRED EMBODIMENTS

Figure 1:
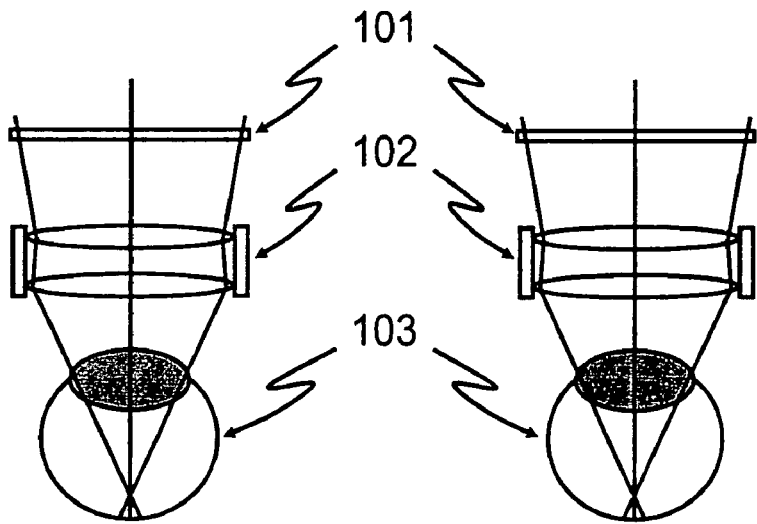
FIG. 1 is a schematic diagram showing an example of a prior art head mounted 3-D display device with fixed focus length.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the designators used in the drawings and the detailed specification to identify components, wherein like components assigned like designators:

| 101 | display screens | 103 | eyes |
|---|---|---|---|
| 102 | image lenses | 201 | planar display screens |
| 202 | planar black masks | 704 | bias micro-lens arrays |
| 203 | planar tunable focus LC lens arrays | 706 | liquid crystal micro-lens |
| 204 | planar bias lens | 708 | bias lens |
| 205 | eyes | 801 | planar emissive LC display screen |
| 206 | liquid crystal micro-lens | 802 | planar tunable focus LC lens array |
| 301 | planar emissive LC display screen | 803 | planar black mask |
| 302 | planar black mask | 804 | bias micro-lens array |
| 303 | planar tunable focus LC lens array | 806 | liquid crystal micro-lens |
| 304 | bias lens | 808 | bias micro-lens |
| 306 | liquid crystal micro-lens | 811 | virtual object of display pixel 1 |

-continued

| | | | |
|---|---|---|---|
| 308 | liquid crystal micro-lens | 812 | virtual object of display pixel 2 |
| 311 | virtual object of display pixel 1 | 813 | retinal image of the display pixel 1 |
| 312 | virtual object of display pixel 2 | 814 | retinal image of the display pixel 2 |
| 313 | retinal image of the display pixel 1 | 815 | eye |
| 314 | retinal image of the display pixel 2 | 901 | planar transmissive LC display screen |
| 315 | eye | | |
| 401 | planar transmissive LC display screen | 1001 | planar reflective LC display screen |
| | | 1101 | image projector |
| 501 | planar reflective LC display screen | 1102 | planar reflective LC display screen |
| 601 | image projector | 1201 | curved display screens |
| 602 | planar reflective display screen | 1202 | curved black masks |
| 701 | planar display screens | 1203 | curved tunable focus LC lens arrays |
| 702 | planar tunable focus LC lens arrays | 1205 | eye |
| 703 | planar black masks | 1205 | eye |
| 1206 | liquid crystal micro-lens | 1314 | retinal image of the display pixal 2 |
| 1301 | curved emissive LC display screen | 1315 | eye |
| 1302 | curved black mask | 1401 | curved transmissive LC display screen |
| 1303 | curved tunable focus LC lens array | | |
| 1306 | liquid crystal micro-lens | 1501 | curved reflective LC display screen |
| 1311 | virtual object of display pixel 1 | 1601 | image projector |
| 1312 | virtual object of display pixel 2 | 1602 | curved reflective display screen |
| 1313 | retinal image of the display pixel 1 | | |

The method, system apparatus and device of the present invention provides a new device structure for producing eye accommodation information using a tunable focus liquid crystal micro-lens array within a head mounted display devices.

Figure 2:
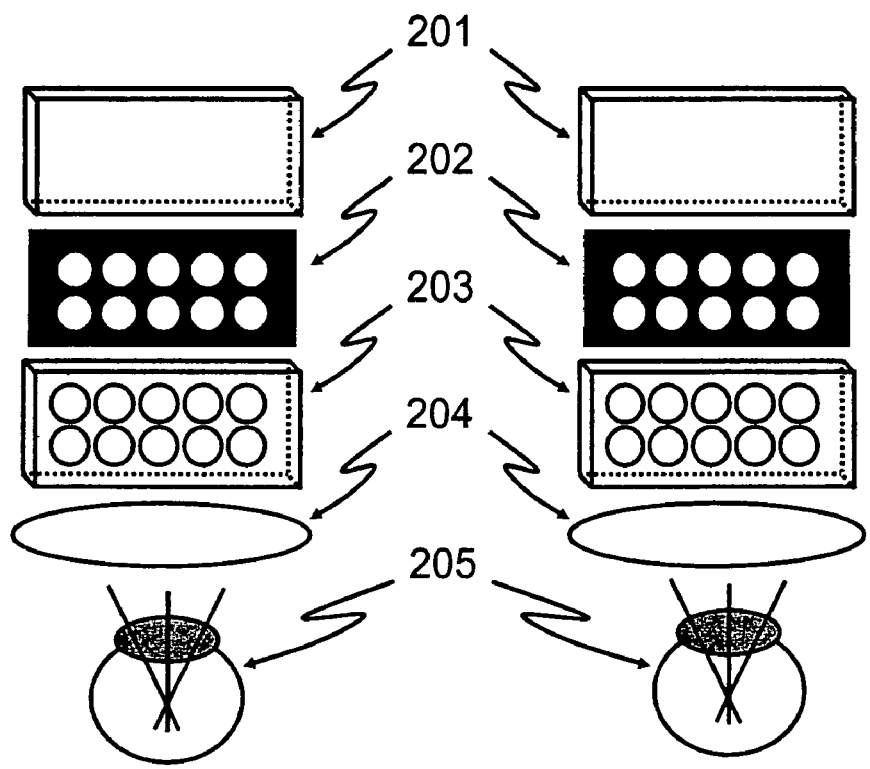
FIG. 2 is a schematic diagram showing an example of a head mounted 3-dimensional display device comprising planar display screen and tunable focus liquid crystal micro-lens array and bias lens according to a first embodiment of the present invention.

FIG. 2 shows an example of the configuration of the tunable focus liquid crystal micro-lens arrays for use in head mounted display devices of the presented invention. The head mounted display includes, for each of the left eye and the right eye, planar display screen 201, black mask 202, tunable focus liquid crystal micro-lens array 203 and a bias lens 204. Planar display screens 201 display the stereoscopic images that are seen by the eyes 205 of the viewer. The planar display screens 201 can be emissive displays, such as OLEDs, transmissive displays, such as transmissive liquid crystal displays, reflective displays, such as reflective liquid crystal displays, or an alternative planar display.

The tunable focus liquid crystal micro-lens arrays 203 are disposed in front of each display screen 201 between the display screen 201 and the corresponding eye 205. The individual liquid crystal lenses 206 of the tunable focus liquid crystal micro-lens arrays 203 are aligned with the display pixels of the display screen 201. Black masks 202 are disposed adjacent to the tunable focus liquid crystal micro-lens arrays 203 and bias lens 204. The black masks 202 have apertures that are aligned with the individual liquid crystal lenses 203 so that only the light from the display screens passes through the liquid crystal lenses 203. While the black masks 202 are shown between the display screen 201 and the liquid crystal micro-lens arrays 203, the black mask 202 can be disposed on either side or on both sides of the liquid crystal micro-lens arrays 203.

When control signals are applied, the liquid crystal micro-lenses of the tunable focus liquid crystal micro-lens arrays 203 alternates the convergence of the light emitting from the corresponding display pixels of the planar display screens 201. Thus, the viewer's eye acclimates to variations in the diopter of the display pixels to enhance the experience of three dimensional visual effects. The bias lenses 204 are disposed between the tunable focus liquid crystal micro-lens arrays 203 and the corresponding eye 205. The bias lenses 204 converges the light into the pupil of the adjacent eye 205 so that all portions of the displayed image visible even though the field of view is large and/or the viewer moves the eye 205.

Figure 3A:
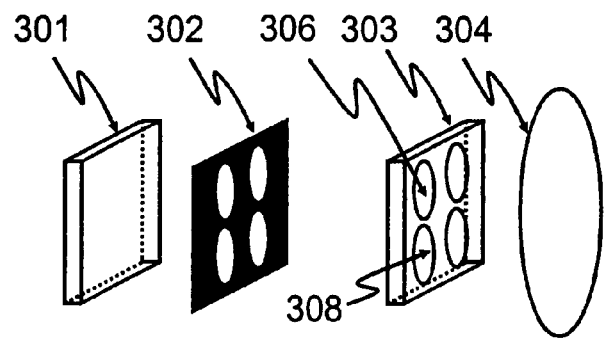
FIG. 3a is a schematic diagram showing an example of the configuration of the optical components according to the first embodiment.
Figure 3B:
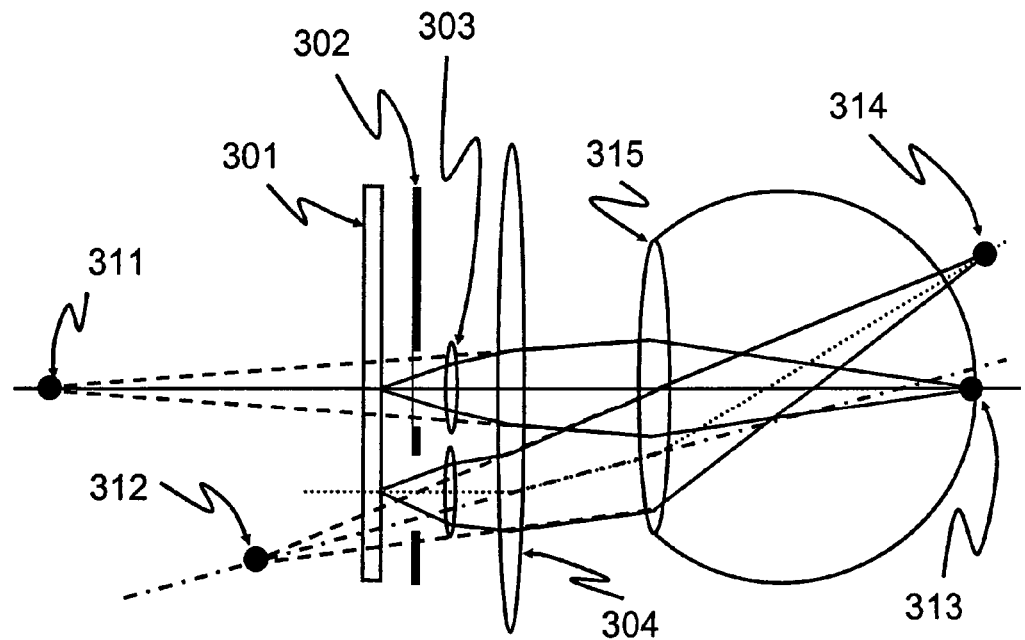

A more specific example of the first embodiment is shown in FIGS. 3a and 3b. FIG. 3a is a schematic diagram showing an example of a configuration of the tunable focus liquid crystal and FIG. 3b shows an example of an image displayed on the planar emissive display screen 301 being transmitted to the viewer's eye using the configuration shown in FIG. 3a. For purpose of illustration and discussion, the device is described for one eye although there is a duplicate device for the other eye.

As shown in FIG. 3b, the head mounted stereoscopic 3-dimensional display devices comprise planar emissive display screens 301, planar black masks 302, planar tunable focus liquid crystal micro-lens arrays 303 and bias lenses 304 as previously described in regard to FIG. 2. The each planar emissive display screen 301 displays one of the stereoscopic images to be seen by the corresponding eye of the viewer.

The tunable focus liquid crystal micro-lens array 303 is disposed in front of the display screen between the planar emissive display screen 301 and the viewer's eye 315. The individual liquid crystal micro-lenses 306 of the tunable focus liquid crystal micro-lens array 303 are aligned with the display pixels of the planar emissive liquid crystal display screen 301. Black mask 302 is disposed adjacent the tunable focus liquid crystal micro-lens array 303 so that only light from the display screens 301 passes through the liquid crystal micro-lenses 306 as shown in FIG. 3b. As previously described, the black mask 302 can be disposed on either side or on both sides of the liquid crystal micro-lens array 303.

Upon application of control signals, the liquid crystal micro-lenses 306 of the tunable focus liquid crystal micro-lens array 303 alternates, from pixel 1 to pixel 2 and vice versa, for convergence of light emitting from the corresponding display pixels of the planar emissive liquid crystal display screen 301. For example, a virtual object 311 of display pixel 1 passes through the liquid crystal micro micro-lens 306 of the tunable focus liquid crystal micro-lens array 303 to the bias lens 304 which converges the virtual image 311 onto the pupil of the eye to provide retinal image 313 of display pixel 1. Similarly, virtual object 312 of display pixel 2 passes through liquid crystal micro-lens 308 to bias lens 304 which converges the virtual image 312 on the eye 315 to provide the retinal image 314 of pixel 2. Thus, the eye 315 of the viewer acclimates itself to the variations in the diopter of the display pixels to enhance the experience of three dimensional visual effects. In this example, the bias lens 304 is configured as shown in FIG. 3a to converge light into the pupils so that approximately all portions of the displayed image are visible even though the field of view is large and/or the viewer moves the eye.

Figure 4A:
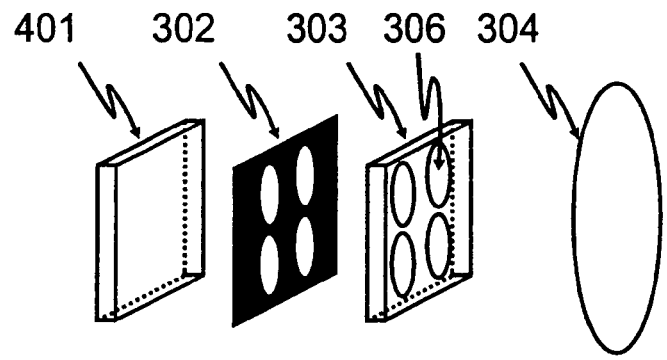
FIG. 4a is a schematic diagram showing another example of the configuration of the optical components according to the first embodiment.
Figure 4B:
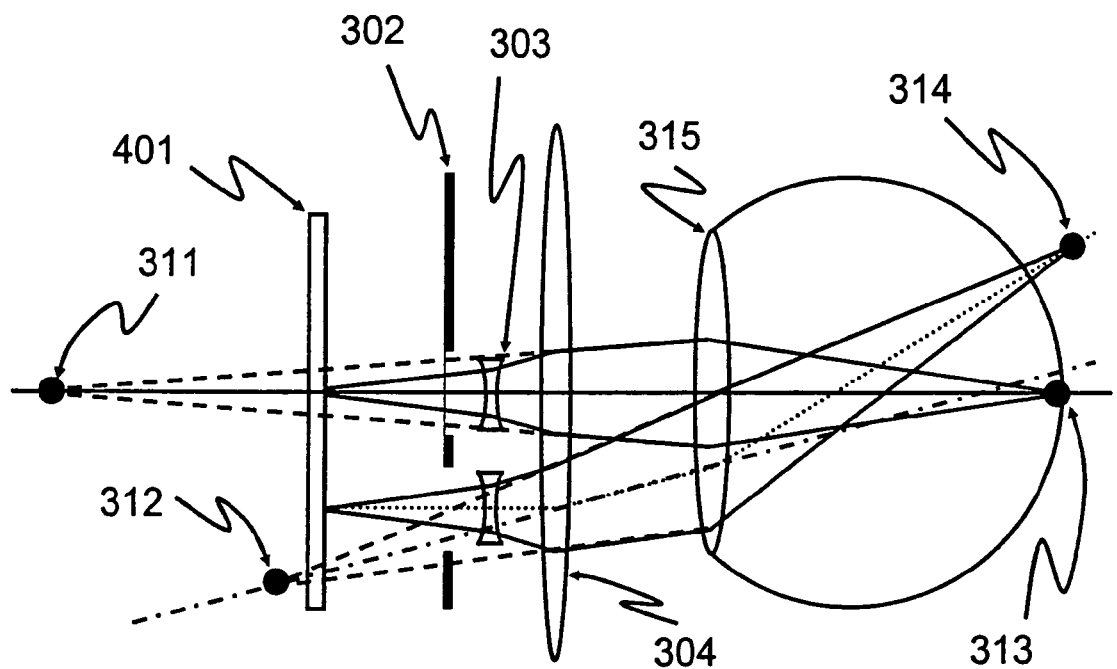

Another example is shown in FIGS. 4a and 4b. FIG. 4a shows the configuration of the optical components and FIG. 4b shows a virtual image 311, 312 from the transmissive display device 401 being transmitted to the user as retinal images 313, 314 using the optical configuration shown in FIG. 4*a*. In this example, the head mounted stereoscopic 3-dimensional display devices includes a planar transmissive liquid crystal display screens 401.

Operationally, one of the stereoscopic images is shown on the planar transmissive liquid crystal display panel 401. As described in the previous example, the tunable focus liquid crystal micro-lens array 303 is disposed between the display screen 401 and the eye 315. the individual liquid crystal lenses 306 and 308 in the tunable focus liquid crystal micro-lens array 303 are aligned with the display pixels of the planar transmissive liquid crystal display panel 401. Black mask 302 with apertures corresponding to the liquid crystal lenses 306 and 308 is disposed adjacent to the tunable focus liquid crystal micro-lens array 303 so that only the light from the display screen pixel 1 and pixel 2, alternately, pass through the liquid crystal micro-lenses 306 as shown in FIG. 4*b*. As in the previous example, the black mask 302 can be disposed on either side or on both sides of the liquid crystal micro-lens array 303.

Figure 5A:
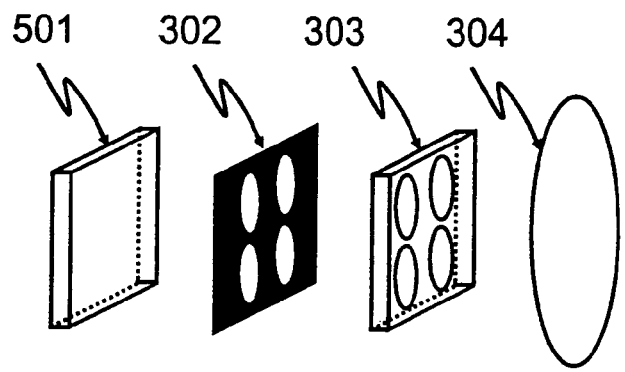
FIG. 5a is a schematic diagram showing another example of the configuration of the optical components according to the first embodiment.
Figure 5B:
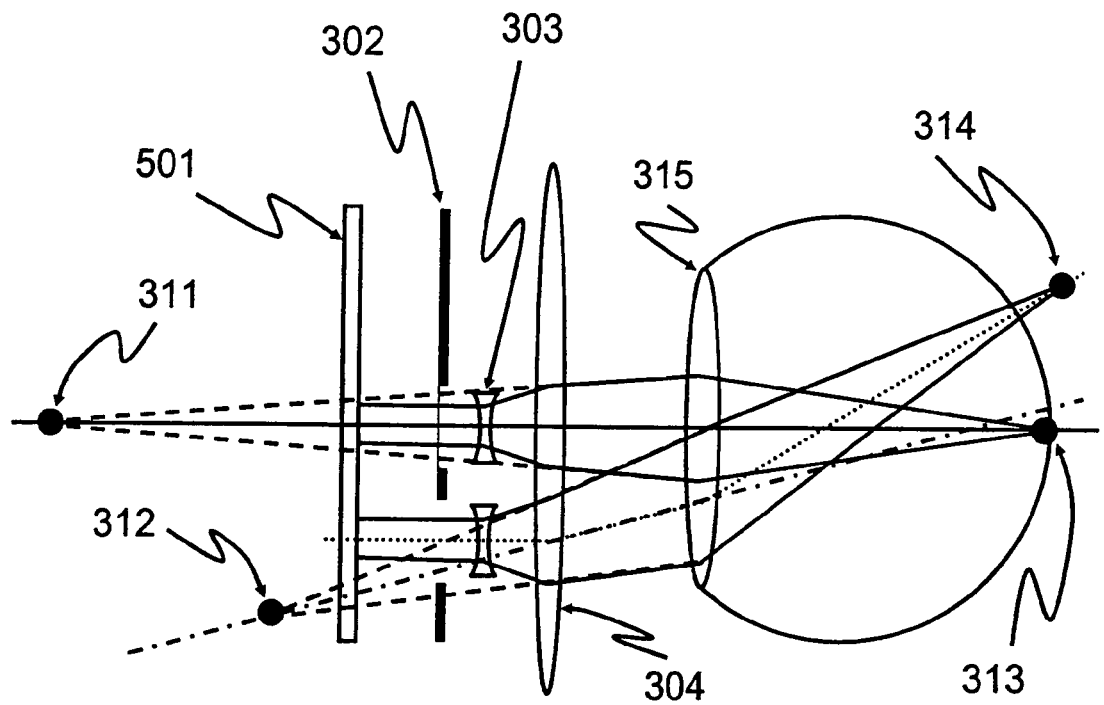

Another example is shown in FIGS. 5*a* and 5*b*. In this example the head mounted stereoscopic 3-D display devices includes planar reflective liquid crystal display screens 501 in combination with the planar black mask 302, planar tunable focus liquid crystal micro-lens arrays 303 and bias lenses 304 as previously described. In this alternative example, the light reflected from the planar reflective liquid crystal display screen 501 is already collimated. One of the stereoscopic images is shown on the planar reflective liquid crystal display panel 501. The tunable focus liquid crystal micro-lens array 303 is disposed between the planar reflective display screen 501 and the eye 315. As previously described, the individual liquid crystal lenses 306 of the tunable focus liquid crystal micro-lens array 303 are aligned with the display pixels of the planar reflective liquid crystal display panel 501. Black mask 302 is disposed adjacent to, and aligned with, the tunable focus liquid crystal micro-lens array 303 so that only light from the display screen passes through the liquid crystal micro-lenses 303 as shown in FIG. 5*b*.

Figure 6A:
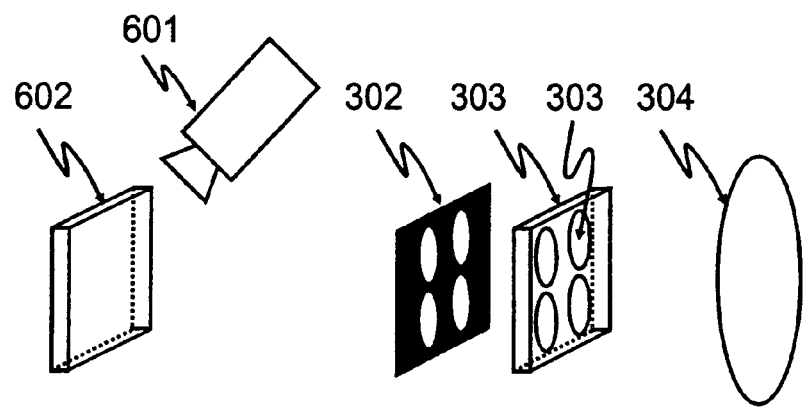
FIG. 6a is a schematic diagram showing another example of the configuration of the optical components according to the first embodiment.
Figure 6B:
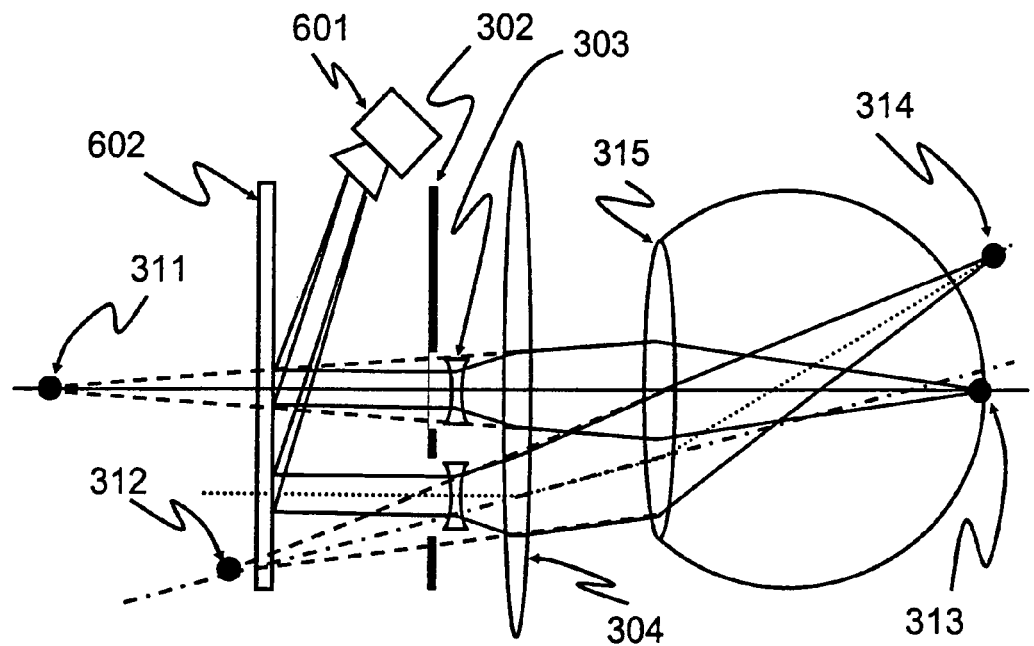

Another example is shown in FIGS. 6*a* and 6*b*. In this example the head mounted stereoscopic 3-D display devices includes image projector 601, planar reflective display screens 602 in combination with the planar black mask 302, planar tunable focus liquid crystal micro-lens arrays 303 and bias lenses 304 as previously described. One of the stereoscopic images is produced from the image projector 601 and reflected from the planar reflective display screen 602. In this alternative example, the light produced from the image projector is already collimated. The tunable focus liquid crystal micro-lens array 303 is disposed between the planar reflective display screen 602 and the eye 315. As previously described, the individual liquid crystal micro-lenses 306 of the tunable focus liquid crystal micro-lens array 303 are aligned with the display pixels of the planar reflective display panel 602. Black mask 302 is disposed adjacent to, and aligned with, the tunable focus liquid crystal micro-lens array 303 so that only light from the display screen passes through the liquid crystal micro-lenses 303 as shown in FIG. 6*b*.

Figure 6C:
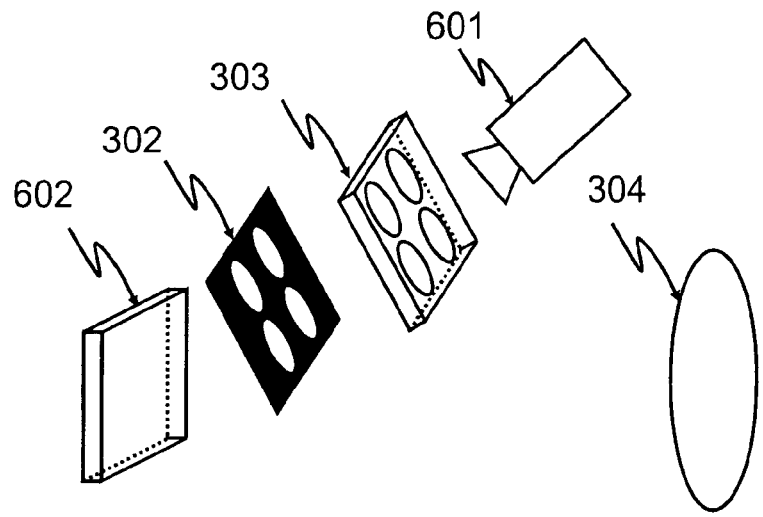
FIG. 6c is a schematic diagram showing another example of the configuration of the optical components according to the first embodiment.
Figure 6D:
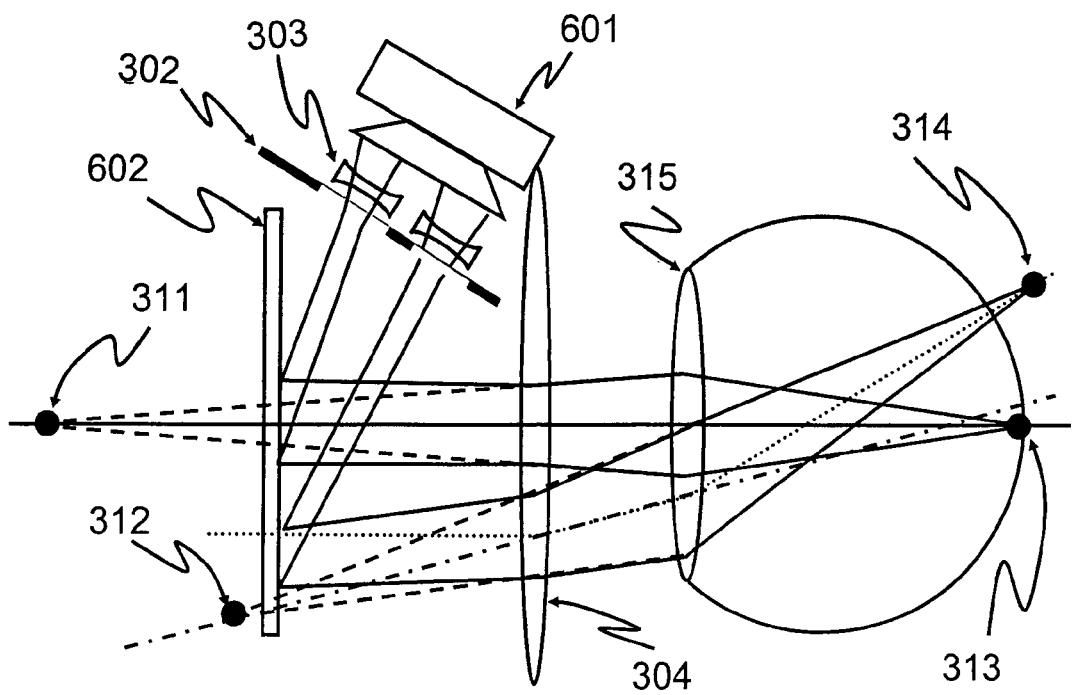
FIG. 6d shows another example of a virtual image displayed on the planar reflective display screen being provided to the user as a retinal image using the configuration shown in FIG. 6c.

An alternate disposition of the tunable focus liquid crystal micro-lens array 303 for this example is illustrated in FIGS. 6*c* and 6*d*. The tunable focus liquid crystal micro-lens array 303 is disposed between the image projector 601 and the planar reflective display screen 602. Black mask 302 is disposed adjacent to, and aligned with, the tunable focus liquid crystal micro-lens array 303 so that only light from the display screen passes through the liquid crystal micro-lenses 303 as shown in FIG. 6*b*.

Figure 7:
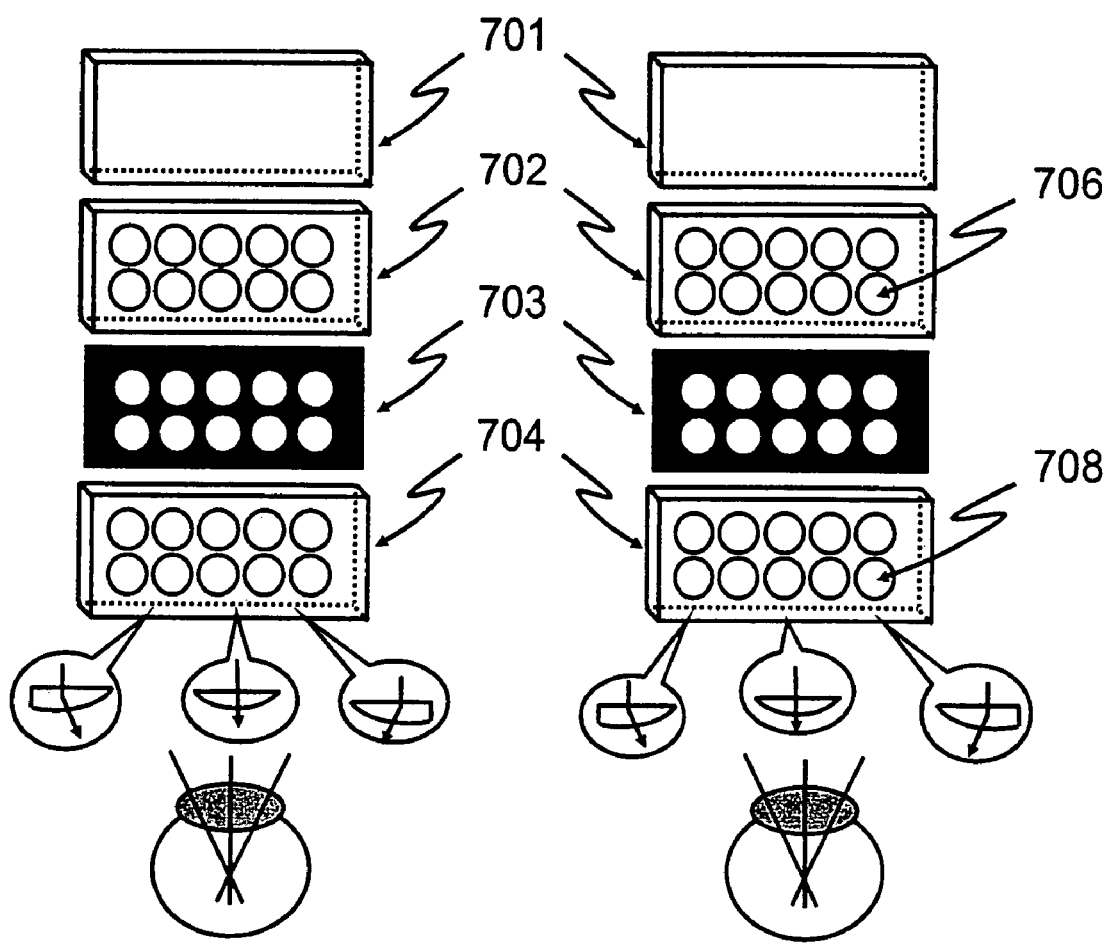
FIG. 7 is a schematic diagram showing an example of a head mounted 3-dimensional display device having a planar display screen, tunable focus liquid crystal micro-lens array and bias micro-lens array according to a second embodiment of the present invention.

FIG. 7 show an alternative example of a tunable focus liquid crystal micro-lens array configuration of the present invention. In this example, the head mounted stereoscopic 3-D display devices includes planar display screens 701, planar black masks 703, planar tunable focus liquid crystal micro-lens arrays 702 and bias micro-lens arrays 704. Referring back to FIG. 2, since the display screens of the head mounted displays are arranged at a distance very close to the eyes of the viewer, the power of the bias lenses 204 is large enough to cover the planar tunable focus liquid crystal lens array 203.

To further reduce the weight and the thickness of the head mounted display devices, the bias lenses in FIG. 2 are replaced by the bias micro-lens arrays 704 having individual bias lenses 708 that are aligned with the liquid crystal micro-lenses 706 of the planar tunable focus liquid crystal micro-lens arrays 702. In the example shown in FIG. 7, the planar black masks 703 is located between the bias micro-lens arrays 704 and the planar tunable focus liquid crystal micro-lens arrays 702 although the planar black mask 703 can alternatively be located on the opposite side or on both sides of the planar tunable focus liquid crystal micro-lens arrays 702.

The planar display screens 701 can be emissive displays, such as OLEDs, transmissive displays, such as transmissive liquid crystal displays, reflective displays, such as reflective liquid crystal displays, or other planar displays. The tunable focus liquid crystal micro-lens arrays 702 are disposed in front of each display screen between the display screen and the eyes 315. The liquid crystal micro-lenses 706 of the tunable focus liquid crystal micro-lens arrays 702 and bias lenses 708 of the bias micro-lens arrays 704 are aligned with one another and with the display pixels of the display screen 701.

Figure 8A:
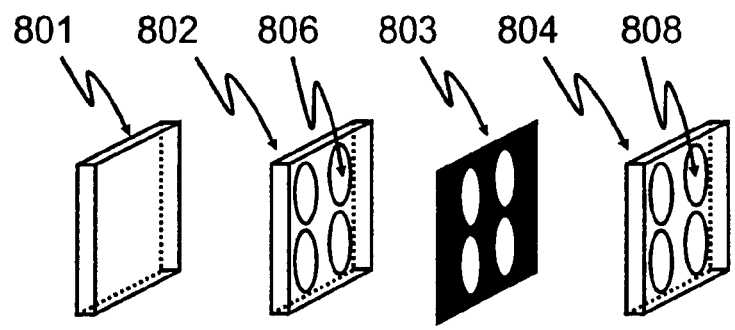
FIG. 8a is a schematic diagram showing an example of the configuration of the optical components according to a second embodiment.
Figure 8B:
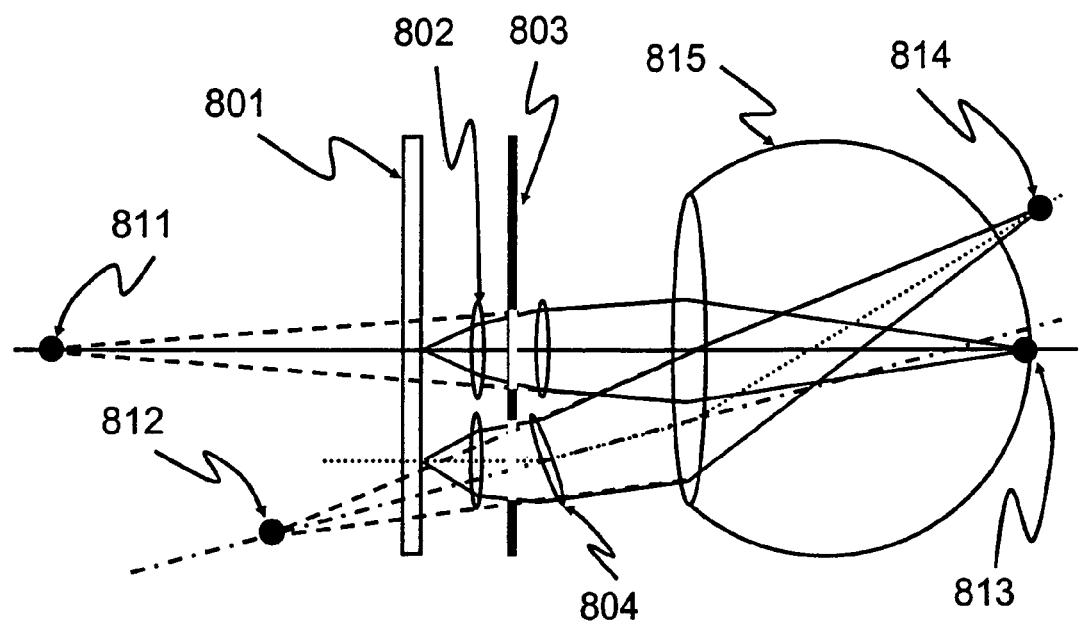

FIGS. 8*a* and 8*b* show another example of the present invention using the configuration shown in FIG. 7. FIG. 8*a* is a schematic diagram showing another example of the configuration of the optical components and FIG. 8*b* shows an example of a virtual image 811 and 812 displayed on the planar emissive display screen as pixels 1 and 2 being transmitted to the viewer's eye 815 as a retinal image 813 and 814, respectively, using the configuration shown in FIG. 8*a*. In this example the planar display screens are planar emissive liquid crystal display screens 801.

As described in regard to FIG. 3, when the planar display screen is an emissive display screen 801, head mounted stereoscopic 3-D display devices includes planar emissive liquid crystal display screen 801, planar black masks 803, planar tunable focus liquid crystal micro-lens arrays 802 and bias micro-lens arrays 804. The bias micro-lenses 808 of the bias micro-lens array 804 are aligned with the liquid crystal micro-lenses 806 of the tunable focus liquid crystal micro-lens array 802. Operationally, the device reflects images from the planar emissive liquid crystal display 801 screen in the same manner as described in regard to FIG. 3*b*.

Figure 9A:
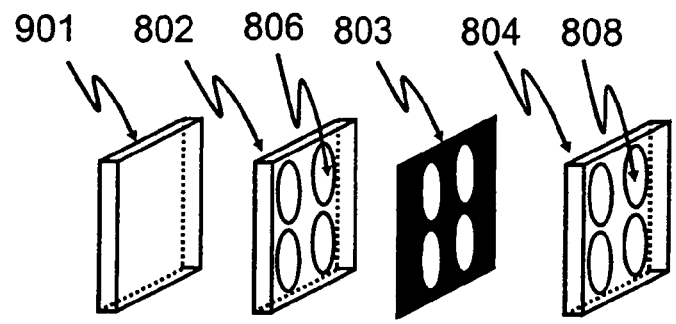
FIG. 9a is a schematic diagram showing another example of the configuration of the optical components according to the second embodiment.
Figure 9B:
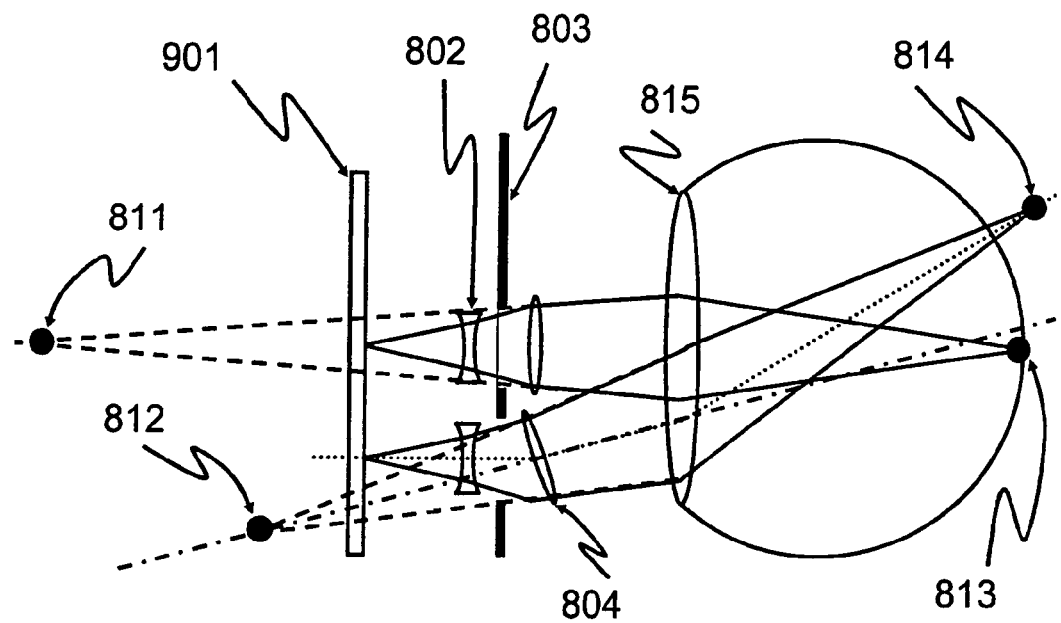

Another example of the present invention is shown in FIGS. 9*a* and 9*b*. Like the head mounted stereoscopic 3-D display device previously described in regard to FIG. 4*b*, the planar display screen is alternatively a planar transmissive display screen 901. The images are displayed on the planar transmissive liquid crystal display panel 901 are transmitted to the viewer in the same manner described in regard to FIG. 4*b*.

Figure 10A:
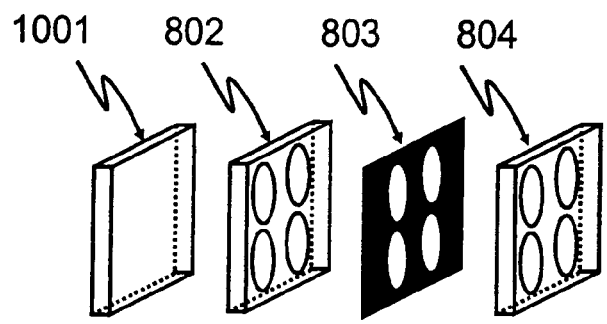
FIG. 10a is a schematic diagram showing another example of the configuration of the optical components according to the second embodiment.
Figure 10B:
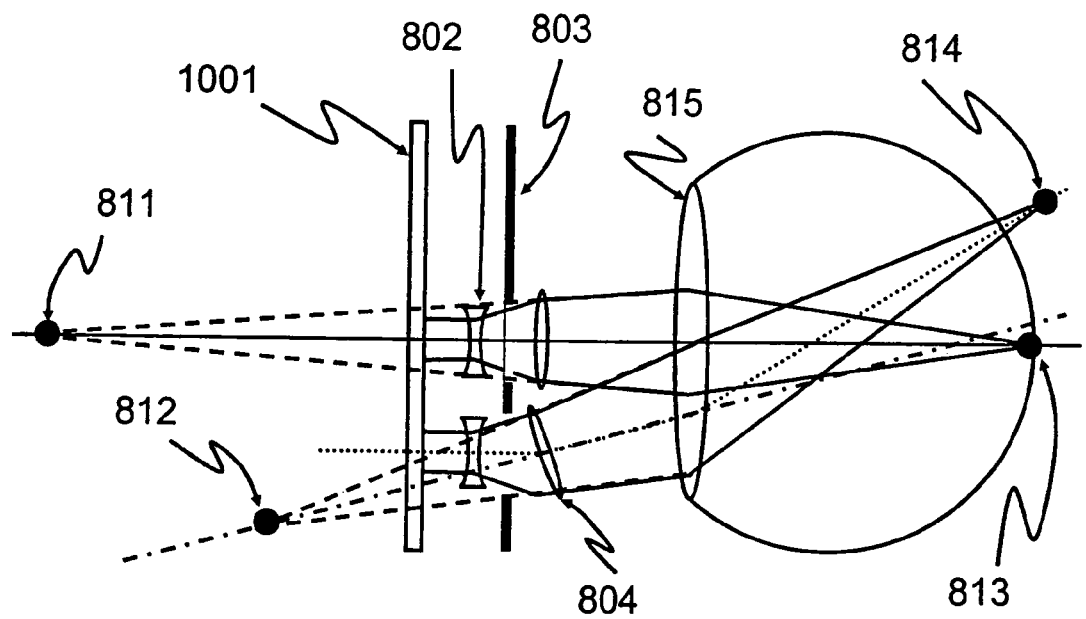

FIGS. 10*a* and 10*b* show yet another example of the present invention. In this embodiment, the planar display screen is a planar reflective liquid crystal display screen 1001 wherein the light reflected from the display screen 1001 is already collimated as described in regard to the example shown in FIG. 5b. The difference between this example and the example shown in FIG. 5b is plural bias micro-lenses 808 in the bias micro-lens array 804 which are aligned with the plural liquid crystal micro-lenses 806 in the tunable focus liquid crystal micro-lens array 802.

Figure 11A:
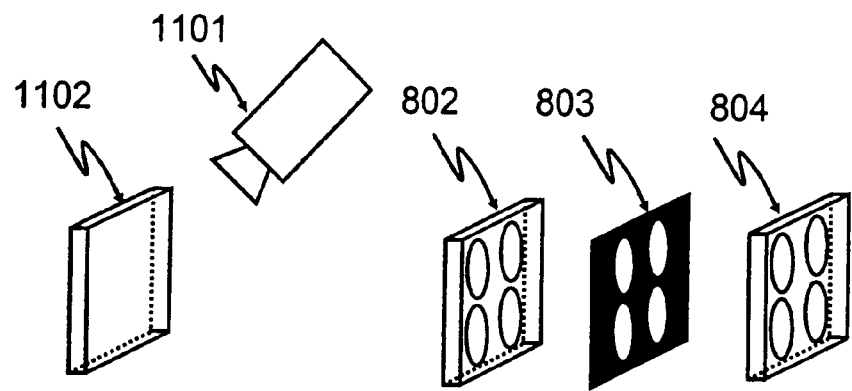
FIG. 11a is a schematic diagram showing another example of the configuration of the optical components according to the second embodiment.
Figure 11B:
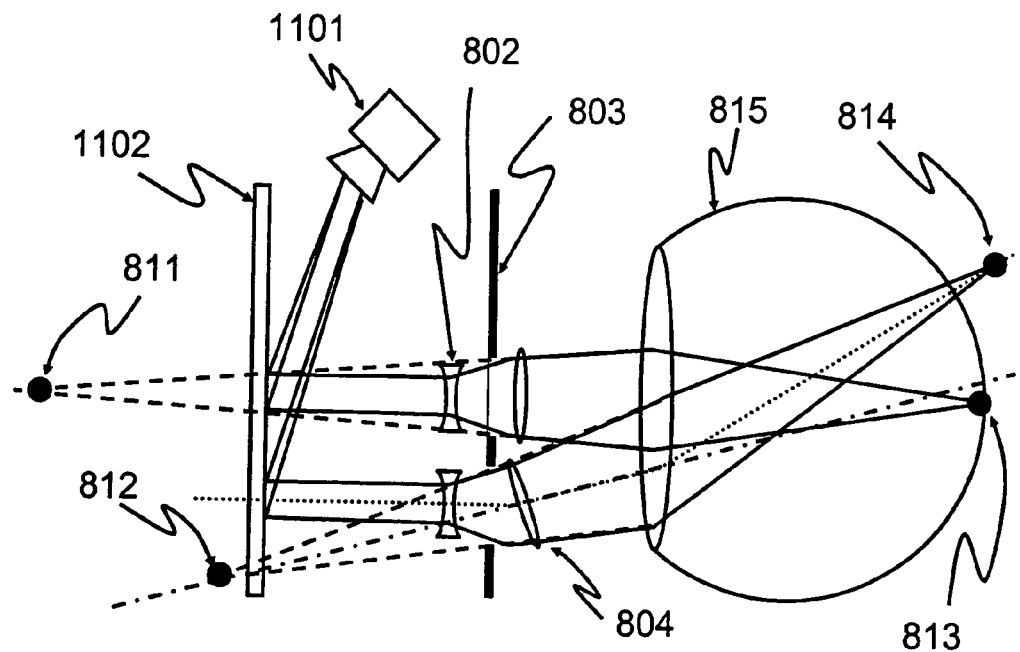

FIGS. 11a and 11b show another example of the present invention. In this embodiment, the planar display screen is a planar reflective screen 1102 wherein the light produced from the image projector 1101 is reflected from the display screen 1102. The tunable focus liquid crystal micro-lens array 802 is disposed between the planar reflective display screen 1102 and the eye 815. The difference between this example and the example shown in FIG. 6(b) is plural bias micro-lenses 808 in the bias micro-lens array 804 which are aligned with the plural liquid crystal lenses 806 in the tunable focus liquid crystal micro-lens array 802.

Figure 12:
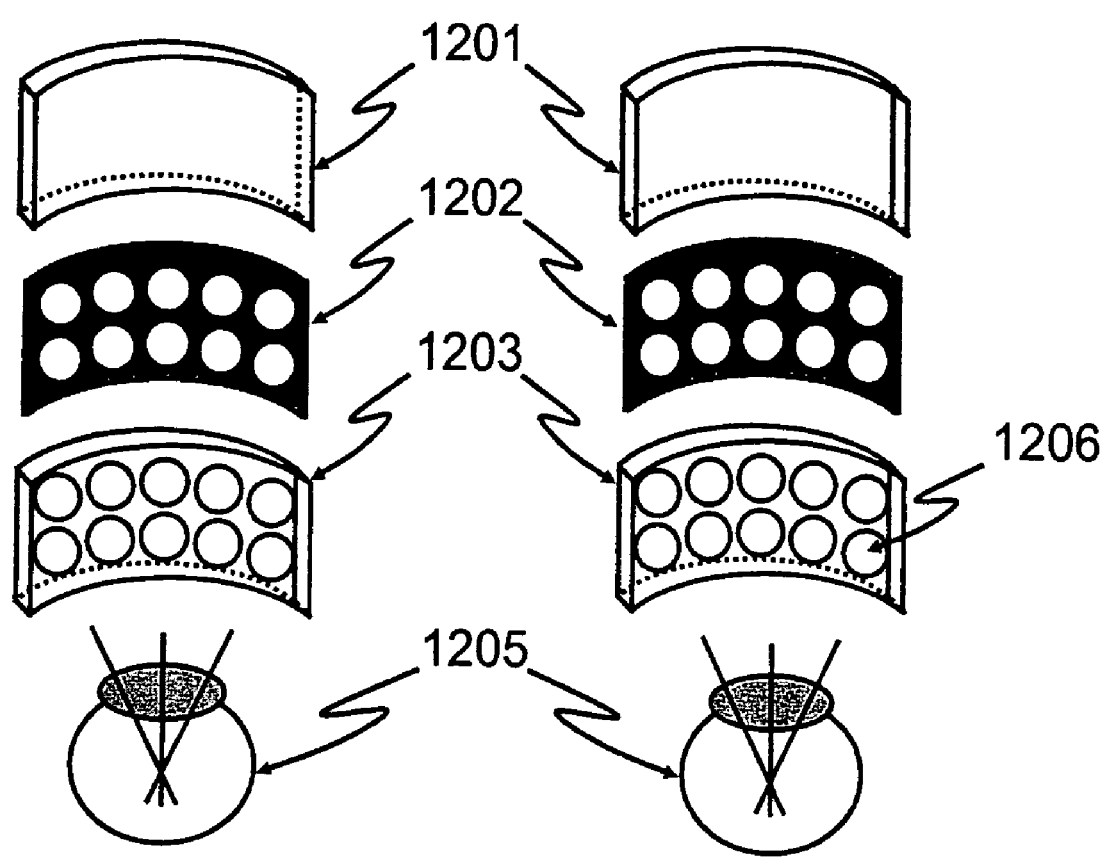
FIG. 12 is a schematic diagram showing an example of a head mounted 3-dimensional display device comprising curved display screen and tunable focus liquid crystal micro-lens array according to a third embodiment.

FIG. 12 shows yet another example of the of the tunable focus liquid crystal micro-lens arrays components and their placement with respect to the viewer's eye 1205. In this example, the head mounted stereoscopic 3-D display device includes curved display screens 1201, curved black masks 1202 and curved tunable focus liquid crystal micro-lens arrays 1203. Another difference between the configurations shown in FIGS. 2 and 8 and the configuration shown in FIG. 12, the device does not include a bias lens or a bias micro-lens arrays. The curved display screens 1201 can be emissive displays, such as OLEDs, transmissive displays, such as transmissive liquid crystal displays, reflective displays, or other curved displays.

The tunable focus liquid crystal micro-lens arrays 1203 are disposed between the display screens 1201 and the viewer's eye 1205. The plural liquid crystal micro-lenses 1206 of the tunable focus liquid crystal micro-lens arrays 1203 are aligned with the display pixels of the display screen 1201 so that the convergent light passes through the liquid crystal micro-lenses 1206 as described in the previous examples. Curved black masks 1202 are disposed adjacent to the curved tunable focus liquid crystal micro-lens arrays 1203 so that the light from the display screens only passes through the liquid crystal micro-lenses 1203. As with the previous examples, the curved black masks 1202 can be disposed on either side or both sides of the curved tunable focus liquid crystal micro-lens arrays 1203.

Figure 13A:
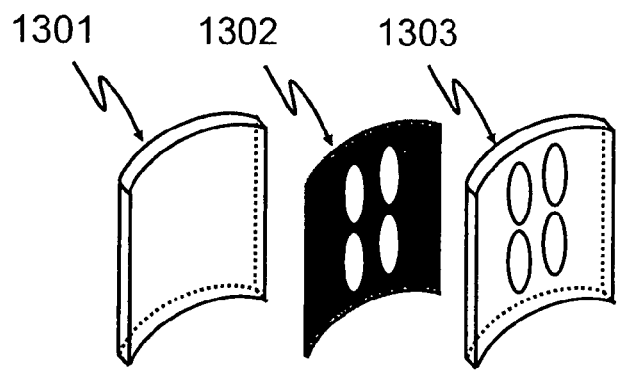
FIG. 13a is a schematic diagram showing an example of the configuration of the optical components according to the third embodiment.
Figure 13B:
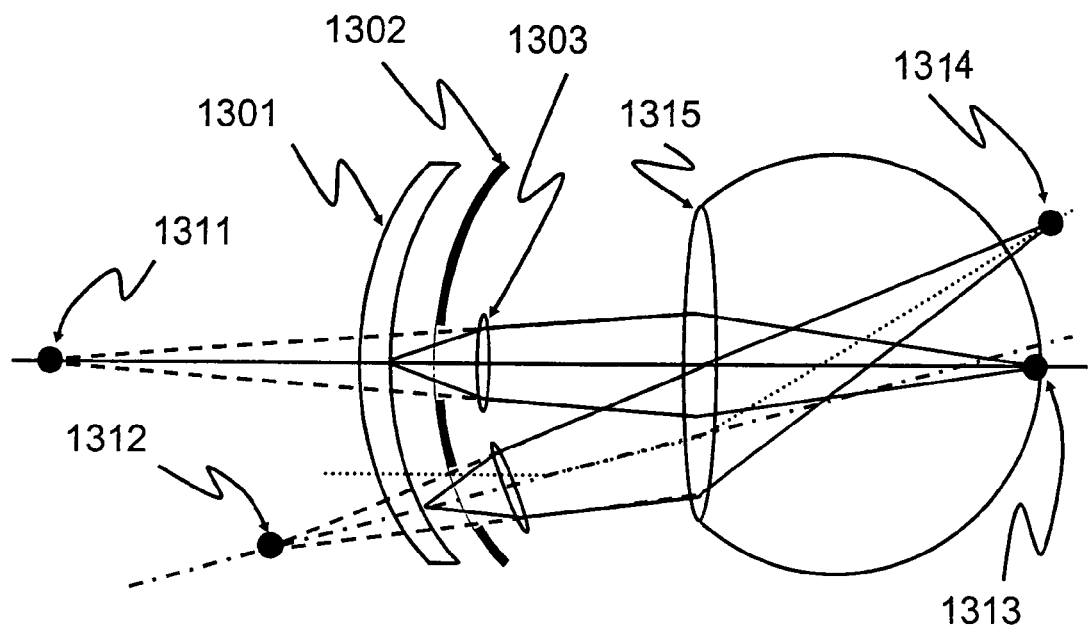

A more specific example is shown in FIGS. 13a and 13b. FIG. 13a shows the optical components and their placement with respect to one another and FIG. 13b shows the focusing of the virtual images 1311 and 1312 corresponding to a first and second display pixel to the viewer's eye 1315 to produce retinal images 1313 and 1314, respectively. The optical components shown in FIG. 13a are curved as described for the example shown in FIG. 12 with an alternative number of apertures in the curved black masks 1302 and the liquid crystal lenses 1306 of the curved tunable focus liquid crystal micro-lens arrays 1303. As in the previous embodiments, the curved black masks 1302 can be disposed on either side or on both sides of the curved tunable focus liquid crystal micro-lens arrays 1303.

As previously described, when control signals are applied, the liquid crystal lenses 1306 of the tunable focus liquid crystal micro-lens array 1303 alternate the convergence of the light emitting from the corresponding display pixels of the curved emissive display screen 1301 as shown in FIG. 13b so that the corresponding eye acclimates itself to the variations in the diopter of display pixels to enhance the experience of three dimensional visual effects as described in regard to FIGS. 3b and 8b.

Figure 14A:
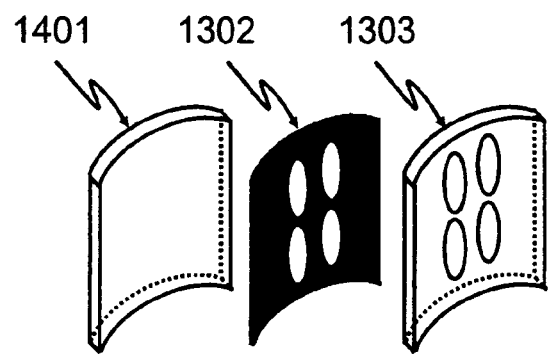
FIG. 14a is a schematic diagram showing another example of the configuration of the optical components according to the third embodiment.
Figure 14B:
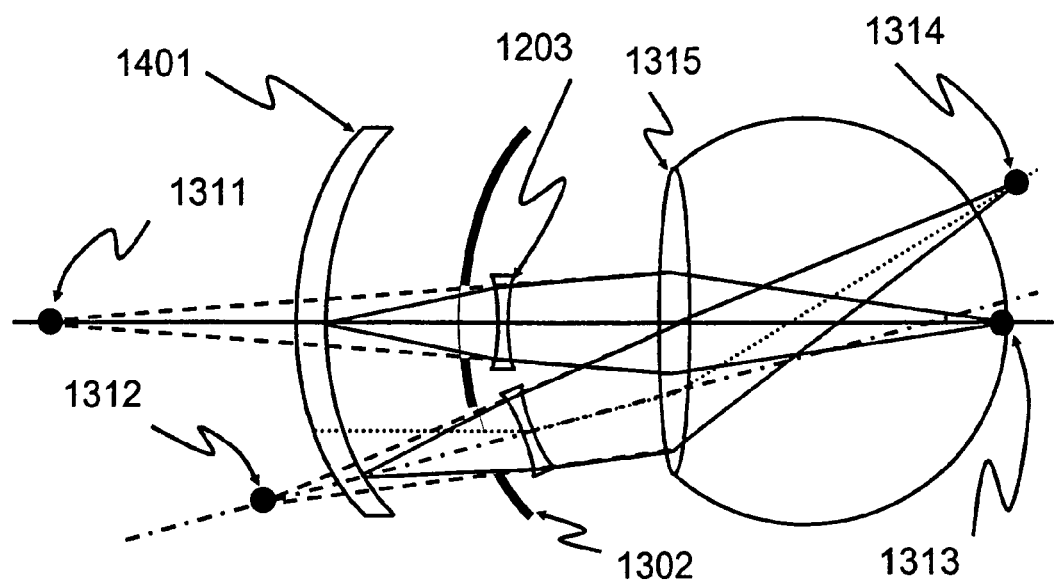

In the example shown in FIGS. 14a and 14b, the head mounted stereoscopic 3-D display devices includes the curved planar transmissive display screen 1401, curved black mask 1202 and curved tunable focus liquid crystal lens array 1203 as shown in FIGS. 12a and 12b. However, in this example, like the examples shown in FIGS. 4b and 9b, the planar transmissive display screen is a curved transmissive display screen 1401 The stereoscopic images are shown on the curved transmissive liquid crystal display panel 1401.

As previously described, when control signals are applied, the liquid crystal micro-lenses of the tunable focus liquid crystal micro-lens array 1203 alternate the convergence of the light emitting from the corresponding display pixels of the planar transmissive liquid crystal display panel 1401 as shown in FIG. 14b to change the diopter of display pixels so that the eye accommodation information is provided.

Figure 15A:
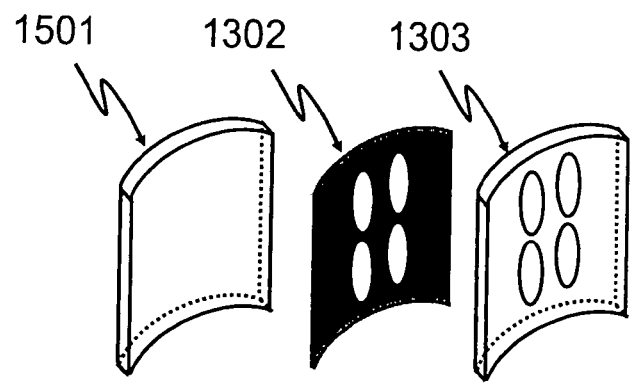
FIG. 15a is a schematic diagram showing another example of the configuration of the optical components according to the third embodiment.
Figure 15B:
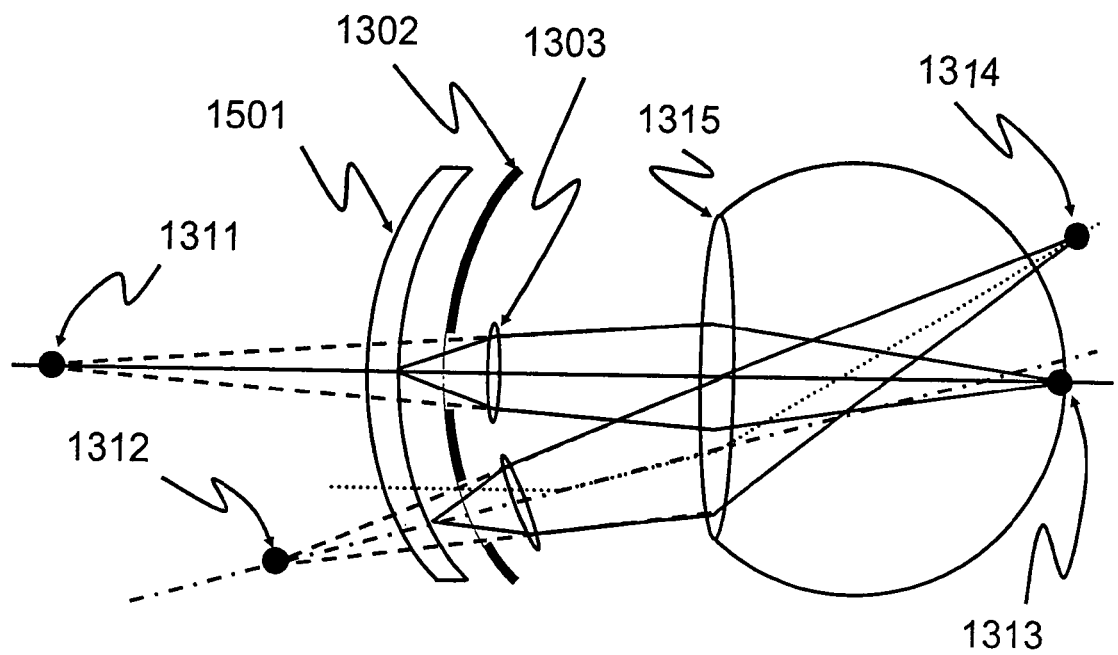

FIGS. 15a and 15b show yet another example of the present invention. In this embodiment, the display screen is a curved reflective liquid crystal display screen 1501 wherein the light reflected from the curved reflective liquid crystal display screen 1501 is already collimated as described in regard to the example shown in FIGS. 5b and 10b.

Figure 16A:
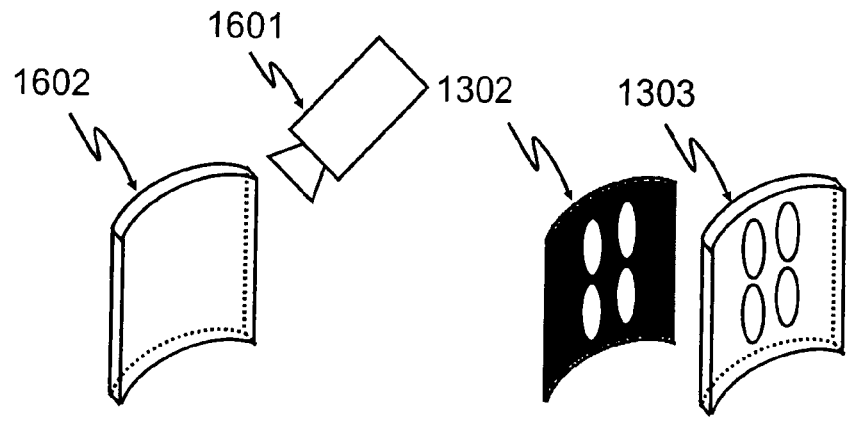
FIG. 16a is a schematic diagram showing another example of the configuration of the optical components according to the third embodiment.
Figure 16B:
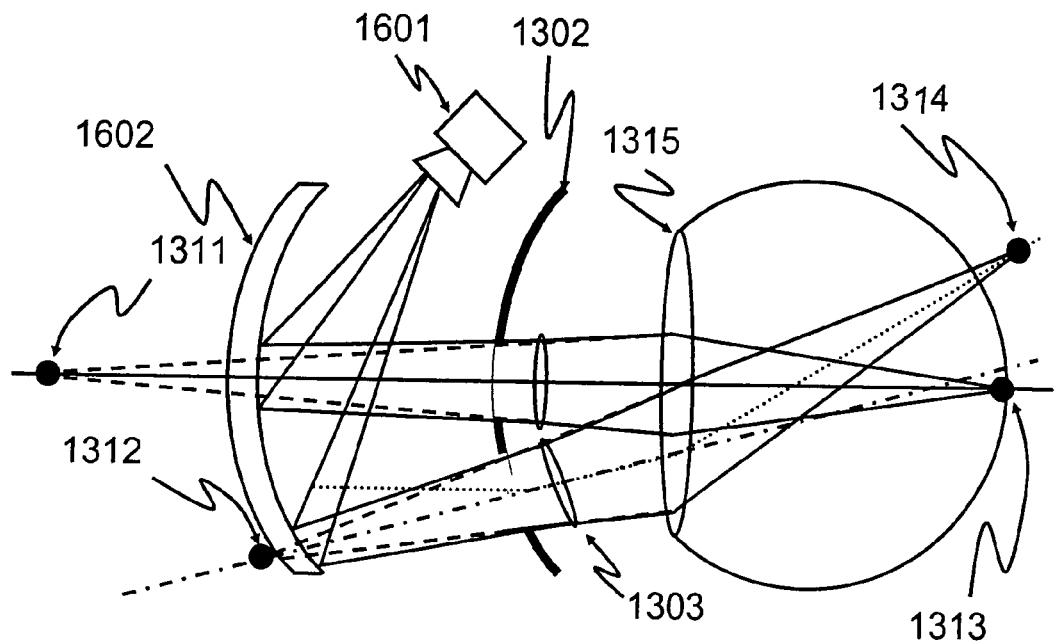
FIG. 16b shows another example of a virtual image displayed on the curved reflective display screen being provided to the user as a retinal image using the configuration shown in FIG. 16b.
Figure 16C:
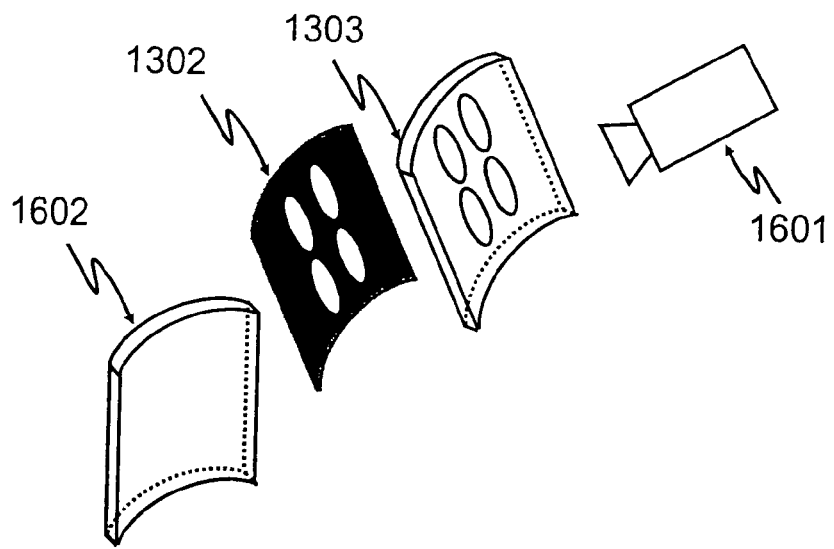
FIG. 16c is a schematic diagram showing another example of the configuration of the optical components according to the third embodiment.
Figure 16D:
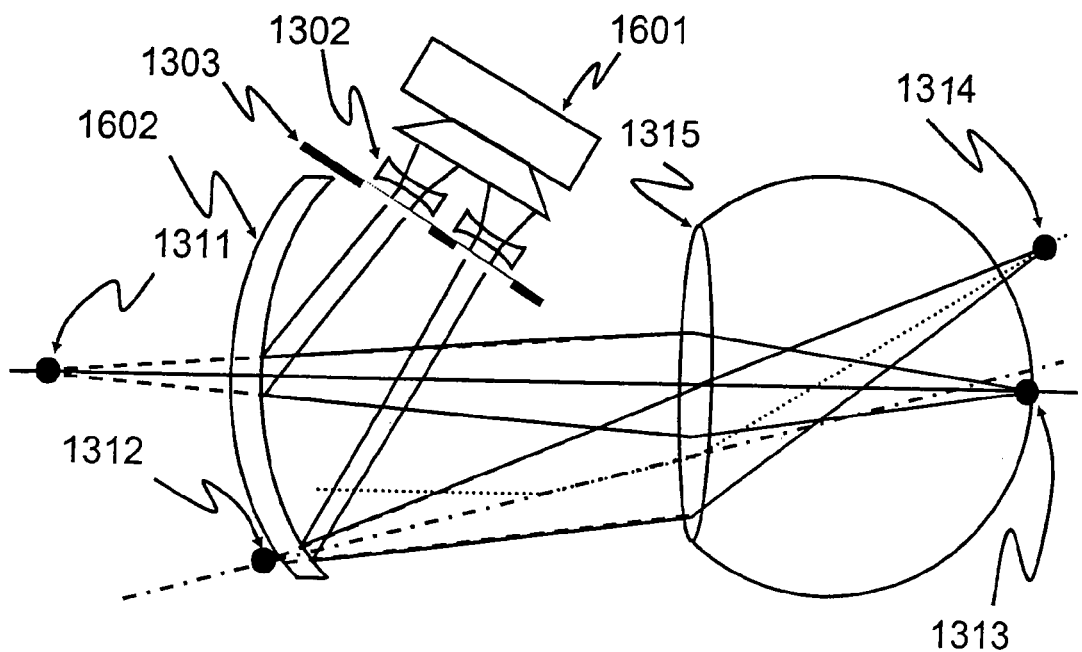
FIG. 16d shows another example of a virtual image displayed on the curved reflective display screen being provided to the user as a retinal image using the configuration shown in FIG. 16c.

FIGS. 16a and 16b show yet another example of the present invention. In this embodiment, the light produced from the image projector 1601 is reflected by the curved reflective display screen 1602. The curved tunable focus liquid crystal micro-lens array 1303 is disposed between the curved reflective display screen 1602 and the eye 1315 as described in regard to the example shown in FIGS. 6b and 11b. FIGS. 16c and 16d show an alternate arrangement of the curved tunable focus liquid crystal micro-lens array 1303 and the curved black mask 1302. The curved tunable focus liquid crystal micro-lens array 1303 is disposed between the image projector 1601 and the curved reflective display screen 1602 in the same configurations as described in regard to the example shown in FIG. 6d. As previously described, the difference between the configuration shown in FIG. 6d and FIG. 16d, is the bias micro-lens array shown in FIG. 6d. While there is a difference in the configuration, the operation of the head mounted display shown in FIG. 16d is the same as described in regard to FIG. 6d.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A head mounted visual stereoscopic display system having an image producing system for producing a 3-dimensional visual image seen by a viewer, the image producing system consisting essentially of:
   for each of the right eye and the left eye of the viewer to provide a spatially distinct image independently to each of the right eye and the left eye,
   one single curved display screen for displaying plural pixels of images;
   one single curved tunable focus liquid crystal micro-lens array having plural liquid crystal micro-lenses each aligned with one of the plural display pixels of the one single curved display screen, wherein the curved tunable focus liquid crystal micro-lens array alternates a diopter of the display pixels; and first and second curved black masks having plural apertures aligned with the plural liquid crystal micro-lenses to prevent light from passing through the intervals between the plural liquid crystal micro-lenses of the tunable focus liquid crystal micro-lens array corresponding independently to one of the right and the left eye.

2. The head mounted visual display system of claim 1, wherein the first curved black mask is located between the curved display screen and the curved tunable focus liquid crystal micro-lens array.

3. The head mounted visual display system of claim 1, wherein the second curved black mask is located between the curved tunable focus liquid crystal micro-lens array and the viewer.

4. The visual display device of claim 1, wherein the curved display screen is:

a curved emissive liquid crystal display screen.

5. The head mounted visual display system of claim 1, wherein the curved display screen is:

a curved transmissive liquid crystal display screen.

6. The head mounted visual display system of claim 1, wherein the curved display screen is:

a curved reflective liquid crystal display screen.

7. The head mounted visual display system of claim 1, wherein the curved display screen is:

a curved reflective display screen.

8. The head visual display system of claim 7 wherein the one single curved tunable focus liquid crystal micro-lens array and adjacent first curved black mask are located between the curved reflective display screen and an eye of the viewer.

9. A head mounted visual stereoscopic display system having an image producing system for producing a 3-dimensional visual image seen by a viewer, the image producing system consisting essentially of:

for each of the right eye and the left eye of the viewer to provide a spatially distinct image independently to each of the right eye and the left eye, one single curved display screen for displaying plural pixels of images;

one single curved tunable focus liquid crystal micro-lens array having plural liquid crystal micro-lenses each aligned with one of the plural display pixels of the one single curved display screen, wherein the curved tunable focus liquid crystal micro-lens array alternates a diopter of the display pixels;

first and second curved black masks having plural apertures alighted with the plural liquid crystal micro-lenses to prevent light from passing through the intervals between the plural liquid crystal micro-lenses of the tunable focus liquid crystal micro-lens array corresponding independently to one of the right and the left eye; and an image projector for producing and projecting the image displayed on the curved reflective liquid crystal display screen, wherein the curved tunable focus liquid crystal micro-lens array and adjacent first curved black mask are located between the curved reflective liquid crystal display screen and the image projector.

* * * * *